Figures 2, 3:
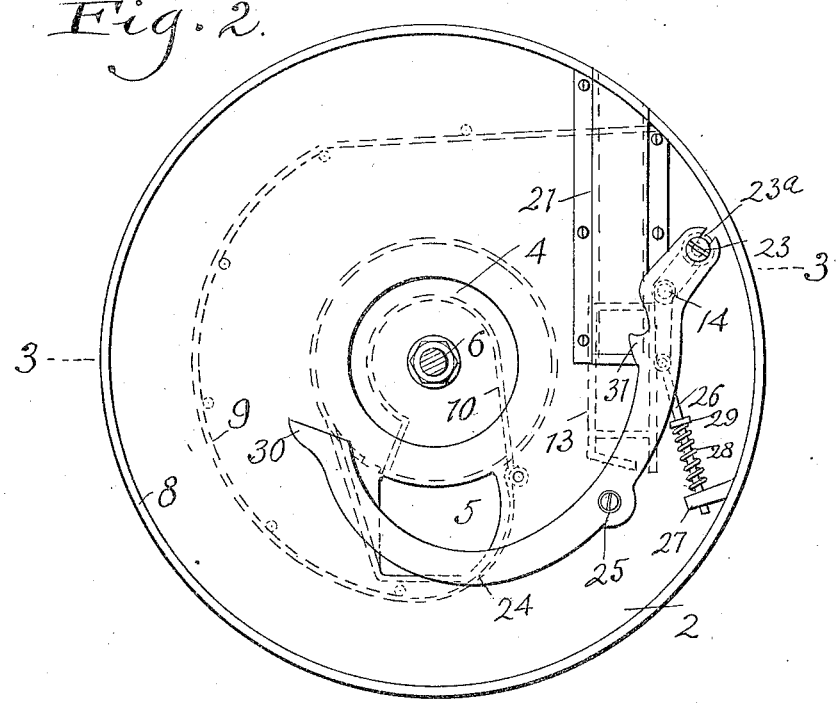

June 1, 1926.
W. D. ROOT
1,586,845
CORN POPPING DEVICE
Filed June 13, 1923
2 Sheets-Sheet 1
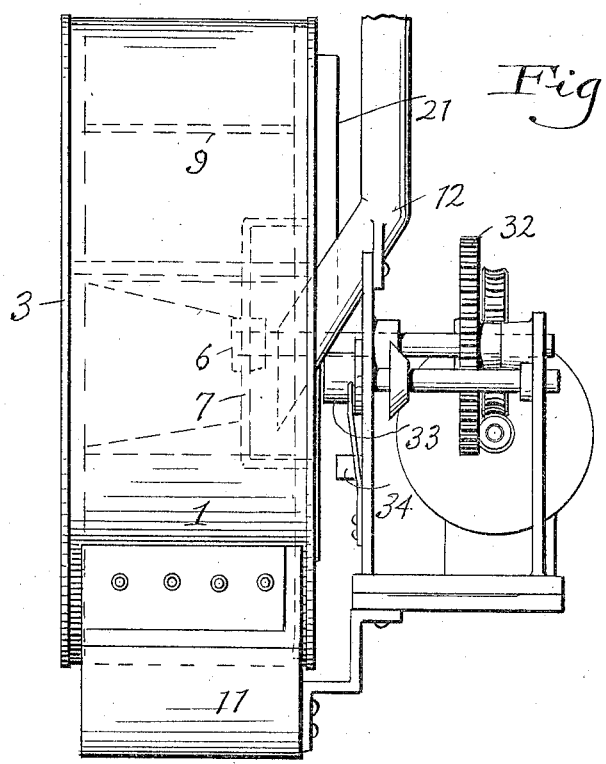
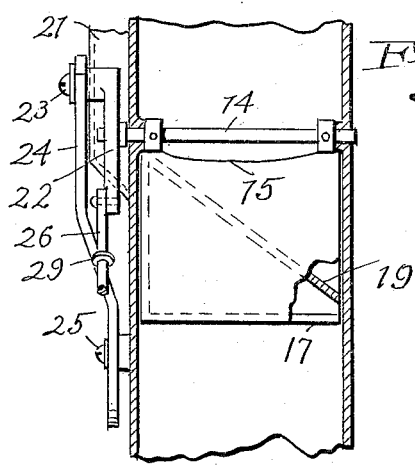
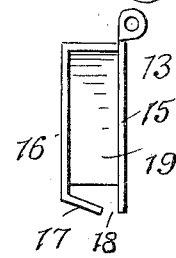
Inventor
William D Root.
By Thurston Kwis & Hudson
Attorneys June 1, 1926.

W. D. ROOT 1,586,845

CORN POPPING DEVICE

Filed June 13, 1923

2 Sheets-Sheet 2

Inventor
William D. Root
By Thurston Kwis & Hudson
Attorney.

Patented June 1, 1926.

1,586,845

UNITED STATES PATENT OFFICE.

WILLIAM D. ROOT, OF CLEVELAND, OHIO, ASSIGNOR TO THE MACHINERY IMPROVEMENT COMPANY, OF CLEVELAND, OHIO, A CORPORATION OF OHIO.

CORN-POPPING DEVICE.

Application filed June 13, 1923. Serial No. 645,065.

This invention relates to a popping device which may be advantageously employed in popping machines of the type in which the popping device is continually driven and has a definite cycle of operations for popping and delivering each charge of corn, which has means for automatically supplying a charge of unpopped corn at the beginning of each cycle of operation and which when once started in operation continues to pop one charge after the other until the driving mechanism is stopped.

An object of the present invention is to provide a popping device for corn popping machines which will automatically separate the popped corn from the unpopped corn during the popping operation and discharge the popped corn.

A further object is to provide in connection with the popping device, a means for automatically discharging the unpopped corn from the popping device at the end of the popping operation. The popping device herein disclosed forms a part of the corn popping machine disclosed in my co-pending application, Serial No. 645,064, filed of even date herewith.

The following description and accompanying drawings set forth in detail certain means embodying the invention, the disclosed means, however, constituting but one of the various mechanical forms in which the principle of the invention may be employed.

Reference should be had to the accompanying drawings forming a part of the specification in which Fig. 1 is a fragmentary view of the popping machine showing the popping cylinder in rear elevation together with the chute for delivering corn to the cylinder and a portion of the operating mechanism therefor; Fig. 2 is a side elevation of the popping cylinder; Fig. 3 is a section on line 3—3 of Fig. 2; Fig. 4 is a fragmentary sectional view showing the device for discharging unpopped corn from the cylinder; Fig. 5 is a side elevation of the gate for controlling the discharge of unpopped corn.

Referring to the accompanying drawings, the popping device is in the form of a rotatably mounted cylinder 1 which is provided with side plates 2 and 3 on the outer and inner sides thereof, the side plate 2 having an axial opening 4 through which unpopped corn is delivered to the cylinder and the inner side plate 3 having a discharge outlet 5 for popped corn between the axis and periphery thereof. The cylinder 1 is carried by a horizontal shaft 6 which extends through the axial opening 4 of the outer side plate 2 and is attached to a plate 7 which is rigidly secured to the side plate 2 and is offset inwardly therefrom opposite the opening 4. The cylindrical wall of the cylinder 1 is in the form of a screen 8, the mesh of which is fine enough to retain the kernels of unpopped corn. An inner spiral screen 9 is attached at its outer end to the screen 8 and at its inner end to a side wall of the discharge chute 10 which delivers the popped corn through the discharge opening 5 in the inner wall 3 of the cylinder. The spiral screen 9 is of coarser mesh than the screen 8 and will permit the unpopped kernels to pass readily therethrough but will retain the popped corn. The inner screen 9 serves to separate the popped corn from the unpopped corn during each revolution of the cylinder and delivers the popped corn to the discharge chute 10 so that the popped corn is delivered from the cylinder during the popping. An electric heater 11 (see Figs. 1 and 3) is located adjacent the underside of the cylinder directly beneath the portion of the cylinder where the unpopped corn is supported during the rotation of the cylinder.

As viewed in Figs. 1 and 4, the cylinder rotates in a clockwise direction. The unpopped corn tends to move with the cylinder but is continuously rolling back toward the central bottom portion thereof. For this reason the unpopped corn will be supported in a position slightly at one side of the central transverse plane of the cylinder and the heater 11 is located to the left of the central transverse plane of the cylinder. The cylinder in its rotation continuously agitates the corn and retains it directly over the heater. The unpopped corn is delivered to the cylinder through a chute 12 which extends into the opening 4 in the outer side plate 3 and discharges against the inner plate 7. The plate 7 serves as a partition between the inlet chute for unpopped corn and the discharge chute for the popped corn.

After the cylinder has operated for a sufficient time to pop all the corn of a charge which will pop, the unpopped corn remaining in the cylinder is discharged therefrom by means of a discharge gate 13 which is mounted within the cylinder a short distance in advance of the point where the spiral screen 9 is attached to the outer screen 8. The gate 13 is fixed to a horizontal shaft 14 which extends through the cylinder and is journaled in the side walls 2 and 3 thereof. The gate 13 is a box-like member which has a flat bottom plate 15 which has its inner edge adjacent the shaft 14 and an outer free edge which is adapted when the gate is moved to discharge position to engage the outer screen 8 of the cylinder and deflect any material within the cylinder inwardly. The gate 13 has a top wall 16 spaced inwardly from the bottom wall 15 and the top wall 16 has an out turned flange 17 at its forward end the edge of which forms with the outer edge of the bottom plate 15, a narrow slot 18, which will permit unpopped kernels of corn to pass into the gate but will prevent the entry of popped kernels. The gate 13 has a rear laterally inclined wall 19 which during the rotation of the cylinder serves to deflect the unpopped corn which has entered the gate through a discharge opening 20 in the side plate 2 into a discharge chute 21 fixed to the outer side of a cylinder. An arm 22 is fixed to the shaft 14 intermediate its ends on the outer side of the side plate 2, the outer end of the arm 22 is provided with an outwardly projecting pin 23 by means of which it is actuated by a curved actuating lever 24 which is pivoted to the side plate 2 by means of a pivot 25 intermediate its ends. When the outer end of the actuating lever 24 is swung inwardly, the gate 13 is swung outwardly to discharging position. A rod 26 is pivoted to the inner end of the actuating arm 22 and has its outer end slidingly mounted in an opening in a bracket 27 carried by the side plate 2. A compression coil spring 28 is interposed between a collar 29 fixed to the rod 26 and the bracket 27. The rod 26 forms with the inner end of the arm 22, a spring toggle which moves past dead center as the discharge gate 13 moves outwardly to discharge position and serves to yieldingly retain the discharge gate 13 either in a position to scoop up the unpopped corn or in a position to discharge the corn which has accumulated within the gate 13 into the discharge chute 21. The inner end of the curved lever 24 is provided with an outwardly projecting portion 30 which is adapted to engage with a suitable trip which is operated by the driving mechanism to move the gate 13 to discharging position. The inner end portion of the lever 24 lies close to the side plate 2 while the outer end portion which overlies the actuating arm 22 is offset outwardly from the side plate 2. The outer end portion of the lever 24 has an inclined lug 31 on the inner side thereof which engages with a fixed trip after the lever 24 has been actuated to shift the discharge gate into engagement with the screen and serves to shift the lever 24 to its original position and to shift the gate 13 to its normal position out of engagement with the screen 8. The lugs 30 and 31 are spaced nearly 180° apart and are so positioned that the lugs 30 will be engaged by the fixed trip after the gate 13 has passed the heater so that as the gate is moving above the axis of the cylinder the unpopped corn therein will be discharged through the discharge chute 21.

The cylinder 1 is continuously rotated by a suitable driving means which drives the gear 32 fixed to the shaft 6. While the cylinder 1 is rotating, the corn which is supported over the heater 11 will be popped and upon each revolution of the cylinder 1 the popped corn will be picked up by the spiral screen 9 and discharged from the screen 9 into the discharge chute 10 from which it is delivered into a suitable receptacle at the side of the cylinder. After a sufficient time has elapsed to pop all of the corn that will pop, the trip roller 33 will be moved inwardly into the path of the lug 30 at the end of the gate operating lever 24, the trip roller 33 when engaged by the lever 24 shifting the same about its pivot to swing the discharge gate 13 outwardly into engagement with the outer screen 8 so that it will pick up the unpopped corn within the cylinder as it passes around the underside of the shaft 6. When the cylinder has turned through substantially half a revolution after the actuation of the lever 24 by the trip roller 33, the lug 31 will be engaged by a fixed roller 34 to shift the discharge gate 13 back to normal position so that as the gate 13 passes over the shaft 6 the unpopped corn therein will be discharged through the chute 21 into a suitable receptacle beneath the cylinder. The trip 33 may be automatically operated at suitable intervals as shown in my co-pending application above referred to or may be manually operated.

Having described my invention, I claim:—

1. A popping device comprising a cylinder rotatable about a horizontal axis, said cylinder having side walls and a peripheral wall upon which the corn is supported during the popping operation, means for automatically separating the popped corn and discharging the same through one side wall of the cylinder as the same rotates during the popping operation, and means for discharging the unpopped corn through the opposite side wall of the cylinder.

2. A popping device comprising a cylinder rotatable about a horizontal axis, said cylinder having an opening in one side wall for the discharge of popped corn and an intake opening in the opposite side wall through which charges of unpopped corn may be fed thereto, a discharge chute within the cylinder leading to the discharge opening, a spiral screen within the cylinder between the side walls, the outer end of the spiral screen being in engagement with the peripheral wall of the cylinder and the inner end of the spiral screen being connected to the chute, and a partition plate between the inner end of the discharge chute and the intake opening.

3. A popping device comprising a cylinder rotatable about a horiontal axis, means for separating the popped corn and discharging the same during the rotation of the cylinder, and means for discharging unpopped corn from the cylinder at the end of the popping operation comprising a gate hinged between the side walls of the cylinder inwardly from the periphery thereof, means for normally holding said gate clear of the peripheral wall of the cylinder, means for swinging said gate into engagement with the peripheral wall of the cylinder to deflect the unpopped corn inwardly from the peripheral wall, and a discharge chute adapted to receive the corn from the gate.

4. A popping device comprising a cylinder rotatable about a horiontal axis, said cylinder having side walls and a peripheral wall upon which the corn is supported during the popping operation, means for separating the popped corn and discharging the same during the rotation of the cylinder, and means for discharging the unpopped corn at the end of the popping operation comprising a discharge chute carried by a side wall of the cylinder, the cylinder and means for delivering the unpopped corn to said chute.

5. In a machine of the character described, the combination with a cylinder rotatable about a horiontal axis, said cylinder having side walls and a peripheral wall upon which the corn is supported during the popping operation, of a discharging device comprising a discharge chute carried by a side wall of the cylinder, a discharging gate within the cylinder for deflecting material from the peripheral wall of the cylinder to the discharge chute, means for normally holding the gate in inoperative position, and means for moving said gate to discharging position.

6. In a machine of the character described, the combination with a cylinder rotatable about a horizontal axis, said cylinder having a discharge opening in a side wall, of a discharging device comprising a discharge gate within the cylinder normally held in inoperative position, said discharge gate being adapted to be moved into engagement with the peripheral wall of the cylinder and to deliver the material within the cylinder to said discharge opening.

7. In a machine of the character described, the combination with a cylinder rotatable about a horizontal axis, said cylinder having side walls and a discharge opening in a side wall, of a discharging device comprising a deflecting member within the cylinder mounted to swing about a transverse axis located inwardly from the periphery of the cylinder, means for normally holding said deflecting member in inoperative position, and means for shifting said deflecting member into engagement with the periphery of the cylinder, said deflecting member being adapted to discharge the material within the cylinder through the discharge opening in the side wall.

8. In a machine of the character described, the combination with a cylinder rotatable about a horizontal axis, said cylinder having a discharge opening in a side wall thereof, of a discharging device comprising a discharge gate within the cylinder, said gate being pivoted upon a transverse axis located inwardly from the periphery of the cylinder, said gate comprising a deflecting plate engageable in one position of the gate with the peripheral wall of the cylinder to deflect material inwardly therefrom and a rear wall inclined with respect to the axis of the cylinder to deflect material to the opening in the side wall, means for shifting said gate from inoperative position to a position in engagement with the periphery of the cylinder.

9. In a machine of the character described, the combination with a cylinder rotatable about a horizontal axis and having a discharge opening in a side wall thereof, of a discharging device within the cylinder for discharging material within the cylinder through said discharge opening, means carried by a side wall of the cylinder for actuating said discharging means, and a trip carried by a fixed support adapted to engage said actuating means to operate said discharging means.

10. In a machine of the character described, the combination with a cylinder rotatable about a horizontal axis and having a discharge opening in a side wall thereof, a deflecting member carried by a horizontal shaft journaled in the side walls of the cylinder and adapted to be moved into engagement with the peripheral wall of the cylinder to deflect material therefrom to the discharge opening, an actuating arm on said shaft outside a side wall of the cylinder, and a spring actuated toggle connected to said arm and to the cylinder, said toggle being moved past dead center as the deflecting member moves from inoperative position into engagement with the peripheral wall of the cylinder whereby said deflecting member is yieldingly held either in engagement with the peripheral wall of the cylinder or in inoperative position.

11. A corn popping device comprising a popping cylinder mounted for rotation about a horizontal axis and having a discharge opening in a side wall thereof, means within the cylinder operable to separate and discharge popped corn during each revolution of the cylinder, and means for discharging unpopped corn from the cylinder at the end of the popping operation, comprising a pivoted gate within the cylinder, said gate having a deflecting plate which in one position of the gate engages the periphery of the cylinder to deflect unpopped corn inwardly therefrom, a deflecting wall upon the inner side of the plate inclined with respect to the axis of the cylinder to deflect the corn laterally to discharge the same from the cylinder and a cover plate extending from the deflecting wall and terminating in a flange over the free edge of the deflecting plate and forming therewith a narrow slot which permits unpopped corn to enter the gate but excludes popped corn therefrom.

12. In a machine of the character described, the combination with a cylinder mounted for rotation about a horizontal axis, and having a discharge opening in a side wall thereof, of a pivoted discharge member within the cylinder adapted in one position to collect material supported upon the interior of the peripheral wall of the cylinder and in another position to discharge the collected material through the discharge opening, an operating lever for said discharge member carried by a side wall of the casing, a trip adapted to be moved into the path of said lever and serving when engaged by the lever to shift the discharge member into engagement with the peripheral wall of the cylinder, means engageable with the actuating lever to shift the discharge member out of contact with the peripheral wall of the cylinder and to discharging position, and means for retaining the discharge member in its material collecting and material discharging positions.

In testimony whereof, I hereunto affix my signature.

WILLIAM D. ROOT.